United States Patent
Filippi et al.

(10) Patent No.: US 10,273,155 B2
(45) Date of Patent: Apr. 30, 2019

(54) PRODUCTION OF AMMONIA MAKE-UP SYNGAS WITH CRYOGENIC PURIFICATION

(71) Applicant: Casale SA, Lugano (CH)

(72) Inventors: Ermanno Filippi, Castagnola (CH); Geoffrey Frederick Skinner, Reading (GB)

(73) Assignee: Casale SA, Lugano (CH)

( * ) Notice: Subject to any disclaimer, the term of this patent is extended or adjusted under 35 U.S.C. 154(b) by 0 days.

(21) Appl. No.: 15/601,690

(22) Filed: May 22, 2017

(65) Prior Publication Data

US 2017/0253481 A1   Sep. 7, 2017

Related U.S. Application Data

(63) Continuation of application No. 14/939,333, filed on Nov. 12, 2015, now abandoned, which is a (Continued)

(30) Foreign Application Priority Data

Sep. 2, 2009   (EP) .................................... 09169289

(51) Int. Cl.
*F25J 3/04* (2006.01)
*C01B 3/34* (2006.01)
(Continued)

(52) U.S. Cl.
CPC ................ *C01B 3/34* (2013.01); *C01B 3/025* (2013.01); *C01B 3/38* (2013.01); *C01B 3/382* (2013.01);
(Continued)

(58) Field of Classification Search
CPC ...... F25J 3/0223; F25J 3/0276; F25J 3/04587; F25J 3/068; F25J 2210/20; C01B 3/025
See application file for complete search history.

(56) References Cited

U.S. PATENT DOCUMENTS 2,865,864 A    12/1958  Eastman et al.
2,895,304 A *   7/1959  Wucherer .............. F25J 3/0219
                                                        62/646
(Continued)

FOREIGN PATENT DOCUMENTS

DE    2007441 A1    9/1971
DE    3816401 A1   11/1989
(Continued)

OTHER PUBLICATIONS

International Search Report issued in connection with PCT/EP2010/062417.
(Continued)

*Primary Examiner* — Brian M King
(74) *Attorney, Agent, or Firm* — Akerman LLP

(57) ABSTRACT

A process and a related equipment for making ammonia make-up synthesis gas are disclosed, where: a hydrocarbon feedstock is reformed obtaining a raw ammonia make-up syngas stream; said raw syngas is purified in a cryogenic purification section refrigerated by a nitrogen-rich stream produced in an air separation unit; the nitrogen-rich stream at output of said cryogenic section is further used for adjusting the hydrogen/nitrogen ratio of the purified make-up syngas; an oxygen-rich stream is also produced in said air separation unit and is fed to the reforming section.

12 Claims, 2 Drawing Sheets

Related U.S. Application Data continuation of application No. 13/393,740, filed as application No. PCT/EP2010/062417 on Aug. 25, 2010, now abandoned.

(51) Int. Cl.

| | |
|---|---|
| *C01B 3/02* | (2006.01) |
| *C01B 3/38* | (2006.01) |
| *C01B 3/48* | (2006.01) |
| *C01B 3/50* | (2006.01) |
| *C01B 3/58* | (2006.01) |
| *F25J 3/02* | (2006.01) |

(52) U.S. Cl.
CPC ............... *C01B 3/48* (2013.01); *C01B 3/506* (2013.01); *C01B 3/586* (2013.01); *F25J 3/0209* (2013.01); *F25J 3/0219* (2013.01); *F25J 3/0276* (2013.01); *F25J 3/04539* (2013.01); *F25J 3/04587* (2013.01); *C01B 2203/0216* (2013.01); *C01B 2203/0233* (2013.01); *C01B 2203/0283* (2013.01); *C01B 2203/046* (2013.01); *C01B 2203/047* (2013.01); *C01B 2203/0445* (2013.01); *C01B 2203/0475* (2013.01); *C01B 2203/068* (2013.01); *C01B 2203/1241* (2013.01); *F25J 2200/02* (2013.01); *F25J 2200/74* (2013.01); *F25J 2210/20* (2013.01); *F25J 2210/42* (2013.01); *F25J 2270/904* (2013.01); *F25J 2290/80* (2013.01); *Y02C 10/12* (2013.01); *Y10T 29/49716* (2015.01)

(56) References Cited

U.S. PATENT DOCUMENTS

| | | | |
|---|---|---|---|
| 3,442,613 A * | 5/1969 | Grotz, Jr. | ............... C01B 3/025 252/374 |
| 3,572,046 A | 3/1971 | Grotz, Jr. | |
| 4,917,716 A | 4/1990 | Schmid et al. | |
| 5,736,116 A * | 4/1998 | LeBlanc | ............... C01B 3/025 423/359 |
| 5,775,128 A * | 7/1998 | Drnevich | ............... C01B 3/025 62/632 |
| 2007/0180768 A1 | 8/2007 | Briesch et al. | |

FOREIGN PATENT DOCUMENTS

| | | |
|---|---|---|
| DE | 102005046790 A1 | 4/2007 |
| EP | 1503160 A1 | 2/2005 |
| GB | 1156003 A | 6/1969 |
| JP | 54779169 A | 6/1979 |

OTHER PUBLICATIONS

W.D. Verduijn, "Operating Experience with a Cryogenic Syngas Purifier—extrait du manuel Ammonia Plant Safety" New York: American Institute of Chemical Engineers, 1979.

Springer Verlag, "Ammonia: Catalysis and Manufacture" Anders Nielsen, 1995, ISBN: 3-387-58335-1.

Lurgi AG et Ammonia Casale SA, "Megamnnonia, the mega-ammonia process"; AFA 18th International Annual Technical Conference, Casablanca, 2005.

* cited by examiner

PRODUCTION OF AMMONIA MAKE-UP SYNGAS WITH CRYOGENIC PURIFICATION

CROSS-REFERENCE TO RELATED APPLICATIONS

This application is a continuation of U.S. patent application Ser. No. 14/939,333, filed Nov. 12, 2015, which is a continuation of U.S. patent application Ser. No. 13/393,740, filed Mar. 1, 2012, which is a national phase of PCT/EP2010/062417, filed Aug. 25, 2010, and claims priority to European Patent Application No. 09169289.7, filed Sep. 2, 2009, the entire contents of which are incorporated herein by reference.

FIELD OF THE INVENTION

The invention relates to the production of ammonia make-up syngas with cryogenic purification. More in detail, the invention relates to production of a raw ammonia make-up syngas by steam reforming of a hydrocarbon feedstock, such as natural gas, and treatment of the raw syngas by cryogenic purification.

PRIOR ART

It is known to produce ammonia by reaction of a so called ammonia make-up synthesis gas (syngas) comprising hydrogen and nitrogen in a ratio around 3:1, in a suitable high-pressure synthesis loop.

The make-up syngas is usually produced by catalytic steam reforming of a hydrocarbon feedstock, in a front-end section of the ammonia plant. Conventional equipments of the front-end are a primary reformer, a secondary reformer, a cooling/shift converter, a $CO_2$ separation section, and a methanation section. The front-end operates at a pressure not greater than 60-80 bar, and usually in the range of 15 to 35 bar, while the ammonia synthesis loop operates at a higher pressure, e.g. over 100 bar. Hence, another component of the front-end is a main syngas compressor, generally with a multi-stage arrangement, to feed the synthesis loop.

Cryogenic treatment of the syngas is also known in the prior art. U.S. Pat. No. 3,572,046 discloses an apparatus for purification of the raw syngas where excess nitrogen is removed in a cryogenic section, and net refrigeration of said cryogenic section is provided by expansion of the syngas.

U.S. Pat. No. 5,736,116 discloses a retrofitting method by installation of an air separation furnishing an oxygen-rich and a nitrogen-rich stream. The oxygen-rich stream is used to enrich the air feed of the secondary reformer, and increase the hydrogen content of the make-up gas substantially above the design stoichiometry and capacity; the nitrogen-rich stream is supplied to the synthesis loop to obtain a desired hydrogen to nitrogen ratio in the syngas feed to the ammonia converters and compensate for the excess hydrogen in the make-up gas.

The capability of the front-end section is decisive for the capability of the overall ammonia plant. There is a continuous effort to increase the production rate of the ammonia plants, and hence of their front-end section, in relation to size and cost of the equipments. These problems are encountered in the realization of new hydrocarbon steam-reforming based ammonia plants, as well as in the retrofitting of existing ones.

Boosting the capacity of the primary reformer in a substantial manner may be quite expensive. Old tube reformers can be retrofitted by installing replacement tubes made of a more resistant material and, hence, having a greater diameter and smaller thickness (thus providing more passage section) than tubes of the original design. This is possible, however, only for few outdated units. Installing additional tubes is possible but subject to the size of the original reformer; increasing the size of the reformer is also possible but, of course, is expensive and time-consuming. Other solutions are to lower the steam/carbon ratio, which may be effective only in older plants and, in any case, involves a corresponding revamping of the downstream treating section, or to install an additional pre-reformer, which however a relatively low benefit of 10-15% of production rate.

The volumetric rate through the reformers and the following equipments, such as shift converters and $CO_2$-removal units, is often the limit for the maximum achievable output. Many drawbacks are connected with a larger flow rate through the front-end, and can be summarized as: the need to increase the capacity of both the compressor of the air flow and the compressor of the syngas flow, and their driving turbines; the more pressure losses in the front-end; the need to increase the capability of the $CO_2$-removal unit. Increasing the volumetric flow rate through the front-end also involves higher pressure drops and higher duty of the $CO_2$-removal section. Generally, the pressure drop can be reduced only with expensive modifications such as substitution of some valves, transformation of axial reactors into axial-radial units, and so on. Also the $CO_2$-removal section, in general, requires a substantial revamping (e.g. substitution of one or more columns, provision of new columns) to obtain a significant increase in capacity.

A second problem is to increase the air stream from the air compressor, to provide more oxygen to the secondary reformer. Installing new internals of the compressor and possibly of the driving turbine of the compressor itself is effective, but costly, as well as the provision of a further compressor in parallel to the existing one. Installation of a booster, i.e. a pre-compressor disposed to raise the pressure at the intake of the main air compressor, is less expensive but also less effective.

The capacity of the main syngas compressor is also a critical point. Said compressor is a special and expensive item, especially designed to operate with the syngas. It is generally preferred not to install any booster or additional compressor in parallel to the main compressor, because failure of any additional equipment may compromise the reliability of the whole plant and may cause severe damage to the main compressor. A compressor can be revamped by replacing the internals of the compressor and turbine, but this modification is quite expensive.

Summarizing, the boosting of the front-end section of a steam-reforming ammonia plant is faced with a number of limitations and constraints from a technical-economical point of view.

A further technical problem to be considered is the amount of impurities, such as unconverted methane and carbon oxides, and inerts such as Argon, which is contained in the syngas fed to the synthesis loop. The synthesis loop is very sensitive to said impurities, and so there is the need to achieve the best possible purification of the syngas.

The above cited retrofitting method disclosed in U.S. Pat. No. 5,736,116 gives a partial solution to the above problems, disclosing enriched air reforming coupled with injection of nitrogen into the synthesis loop. However, it does not provide a satisfactory solution to all the above problems, and does not take into account the impact on the downstream ammonia loop and the problem of impurities contained in the syngas.

SUMMARY OF THE INVENTION

The problem underlying the invention is to solve the above listed limitations in a cost-effective way. This problem is solved by a process, a plant and a method of revamping according to the following disclosure.

A process for making ammonia make-up synthesis gas, according to the invention, comprises the steps of:

reforming a hydrocarbon feedstock, followed by steps of shift, $CO_2$ removal and methanation, obtaining a raw ammonia make-up syngas stream comprising hydrogen and nitrogen;

treating said raw syngas in a cryogenic purification section obtaining a purified syngas stream;

feeding a liquid nitrogen-rich stream at a cryogenic temperature to said cryogenic purification section;

providing an indirect heat exchange between the syngas and said liquid nitrogen-rich stream in the cryogenic section, said liquid nitrogen-rich stream being at least partly evaporated to provide refrigeration of said cryogenic section.

The liquid nitrogen-rich stream is preferably a substantially pure nitrogen in a liquid state, having a temperature preferably between 185° C. and 190° C. below zero (around 88-93 K). Preferably said liquid nitrogen-rich stream is at least partly evaporated to refrigerate said cryogenic section.

Said nitrogen-rich stream is preferably recovered at output of said cryogenic purification section, after evaporation and heating through the cryogenic section itself, and is mixed with the purified syngas to provide at least a portion of the nitrogen required to adjust the hydrogen/nitrogen ratio of the ammonia make-up syngas.

The liquid nitrogen-rich stream is preferably obtained from an air separation unit. In a preferred embodiment of the process, the nitrogen-rich stream and additionally an oxygen-rich stream are produced in an air separation unit, and said oxygen-rich stream is used as oxidant in the reforming section, preferably by injecting said oxygen-rich stream in a secondary reformer of said reforming section, to increase the production of the make-up syngas.

More preferably, said air separation unit delivers the liquid nitrogen at cryogenic temperature, and additionally a second stream of nitrogen at ambient temperature. The amount of nitrogen required to adjust the HN ratio of the ammonia make-up syngas is provided partly by the evaporated liquid nitrogen-rich stream recovered at the output of the cryogenic section, and partly by said nitrogen-rich stream at ambient temperature.

The above embodiment is preferred for the following reasons. The amount of nitrogen that is necessary to adjust the HN ratio is usually greater than the amount of liquid nitrogen that needs to be evaporated to refrigerate the cryogenic section. The higher is the fraction of liquid nitrogen, the higher is the energy consumption of the air separation unit. Then, in order to save energy, it is preferred that only the minimum amount of nitrogen necessary for the cryogenic process is supplied in liquid form, the remaining nitrogen being delivered at ambient temperature.

Further preferred aspects of the process are as follows. The raw syngas is cooled down to a cryogenic temperature in a main heat exchanger of the cryogenic section, recovering frigories form the cold, purified syngas and from the at least partly evaporated nitrogen-rich stream. A cooled raw syngas is obtained, which is fed to a contacting device for separation of impurities by cryogenic liquefaction. A partially purified syngas is recovered from said contacting device and is further cooled and purified in a condenser, which is refrigerated by said nitrogen-rich stream; a further purified syngas and a condensed fraction are taken at the output of said condenser; the syngas is then re-heated in said main heat exchanger, by heat exchange with the incoming raw syngas and with the nitrogen stream from said condenser.

Preferably the contacting device is a cryogenic column. The condenser can be a part of the column or a separate item, preferably over the column. Refrigeration of said condenser is given by total or partial evaporation of the liquid nitrogen-rich stream.

More in detail, and in a preferred embodiment, the syngas is treated in a column for cryogenic liquefaction, which is part of the cryogenic section, and purified syngas recovered at top of said column is further cooled in a condenser which is refrigerated by partial or total evaporation of the liquid nitrogen-rich stream. A fraction containing methane and others impurities is liquefied in said condenser, and sent back to the column; the further purified syngas is taken at output of the condenser and re-heated in the main heat exchanger, cooling the incoming raw syngas. The nitrogen stream at the output of the condenser and/or a liquid stream containing methane, nitrogen and impurities, recovered at the bottom of the column, may also be used as further heat-exchange media, e.g. fed to the same main heat exchanger to refrigerate the incoming raw syngas stream.

The nitrogen required for adjusting the H/N ratio of the ammonia make-up syngas, i.e. the liquid nitrogen evaporated in the cryogenic section and/or the second nitrogen stream delivered by the ASU at ambient temperature, can be mixed with the purified syngas upstream the main syngas compressor feeding the downstream ammonia synthesis loop, or downstream said main syngas compressor, providing separate compression of the nitrogen. Both embodiments are possible, the separate compression of N2 being however preferred. In this way, a pure make-up syngas substantially consisting of nitrogen and hydrogen in the suitable 3:1 ratio, with very low impurities, is obtained.

The hydrocarbon feedstock is preferably natural gas or substitute natural gas (SNG), but any suitable reformable hydrocarbon may be used.

An aspect of the invention is also a process for producing ammonia, where a make-up syngas is obtained with the above process and reacted in a per se known ammonia synthesis loop. Hence, in accordance with the invention, a plant for the synthesis of ammonia make-up synthesis gas comprises at least:

a front-end section comprising a reforming section adapted to reform a hydrocarbon feedstock and to produce a raw ammonia syngas stream;

a cryogenic purification section treating the raw syngas produced in the front-end;

means feeding a liquid nitrogen-rich stream at a cryogenic temperature to said cryogenic purification section, for use as a heat exchange medium to refrigerate said cryogenic purification section.

At least one indirect heat exchanger between the syngas and said liquid nitrogen-rich stream in the cryogenic section, said liquid nitrogen-rich stream being at least partially evaporated in said heat exchanger(s) to provide refrigeration of said cryogenic section.

According to a preferred aspect of the invention, said means for feeding the nitrogen-rich stream to the cryogenic section comprise at least an air separation unit, also referred to as ASU. The air separation unit delivers the nitrogen-rich stream and additionally delivers an oxygen-rich stream which is preferably used as oxidizer in the reforming section. The ASU may further deliver a nitrogen-rich stream at ambient temperature, for HN ratio adjustment, with the above discussed advantages in terms of energy savings. The ASU can use a conventional process such as cryogenic distillation.

In a preferred embodiment, the front-end comprises a primary reformer, a secondary reformer, and equipments for shift, $CO_2$ removal and methanation. The oxygen-rich stream delivered by the air separation unit is preferably fed to the secondary reformer of the reforming section.

According to a preferred arrangement of the cryogenic section, said cryogenic section comprises at least a contacting device such as a cryogenic condenser; a condenser receiving a partially-purified syngas obtained in the contacting device, and refrigerated by the nitrogen-rich stream; a main heat exchanger where the incoming raw syngas is cooled by heat exchange with one or more of the following available streams: the nitrogen stream, the purified syngas and possibly a liquid fraction separated in the contacting device.

The invention is also applicable to retro-fitting of an existing ammonia plant or of the front-end thereof.

In particular, the invention provides a method for revamping the front-end of an ammonia plant, said front-end section comprising at least a primary reformer and a secondary reformer for converting a hydrocarbon feedstock into ammonia raw make-up syngas, and a cryogenic section for treatment of the raw syngas, the method comprising at least the steps of: installing an air separation unit in parallel to said front-end; providing means for feeding a nitrogen-rich stream produced in said air separation unit to said cryogenic section, for use as refrigerating medium; providing a new line feeding oxygen-rich stream produced in said air separation unit to the secondary reformer, in order to increase the capability of said reforming section. If not present in the original plant, a new cryogenic section may also be provided in the revamping.

The use of nitrogen-rich stream as a cooling medium for the cryogenic section has been found an effective measure to increase the capability of the plant and improve the overall efficiency of the process. A first advantage is that the invention makes use of nitrogen-rich stream as a cooling medium to provide the net refrigeration to the cryogenic section, instead of energy-consuming expansion of the raw syngas, as suggested in the prior art. Expanding at least a portion of the raw syngas, however, is not excluded by the invention and can be adopted—if appropriate—as a further means to refrigerate the cryo section. In such a case, the refrigerated syngas, or at least a part thereof, is expanded in a suitable expander or turbine.

A further advantage is that the nitrogen-rich stream is used in a highly efficient way, i.e. first as a refrigerating medium for the cryo section, and then for H/N ratio adjustment of the purified syngas, avoiding the feed of a substantial amount of inert nitrogen through the purification equipments downstream the reformers. Hence, a significant advantage is obtained without the drawback of a substantial increase of the volumetric flow rate processed in the reformers, shift converter(s) and $CO_2$-removal equipment.

The feeding of the reheated nitrogen stream downstream the front-end, preferably at the intake of the main syngas compressor, reduces the increase in volumetric flow rate through the whole front-end and related problems, including pressure drops and duty of the $CO_2$-removal and methanation section. In fact, the front-end receives only the pure oxygen stream, necessary for boosting the reforming capacity, while the nitrogen stream, which would pass through the front end substantially as inert gas, is appropriately fed only to the synthesis loop, where it is required as one of the reagents to produce ammonia, and in order to establish the correct HN ratio of the make-up syngas.

The invention, moreover, is particularly efficient in the removal of methane, and other impurities from the syngas, thanks to the treatment in the nitrogen-refrigerated cryo section. Less inerts means a more efficient conversion of the reagents nitrogen and hydrogen into ammonia, with consequent reduction in the recirculation of unreacted syngas and lower energy consumption.

Integration with an air separation unit is particularly efficient, making also available an oxygen-rich stream which is advantageously injected into the secondary reformer, thus boosting the capability of the front-end section in terms of production of raw syngas.

The advantages will be more evident with the following detailed description of a preferred embodiment.

DETAILED DESCRIPTION OF THE INVENTION

Figure 1:
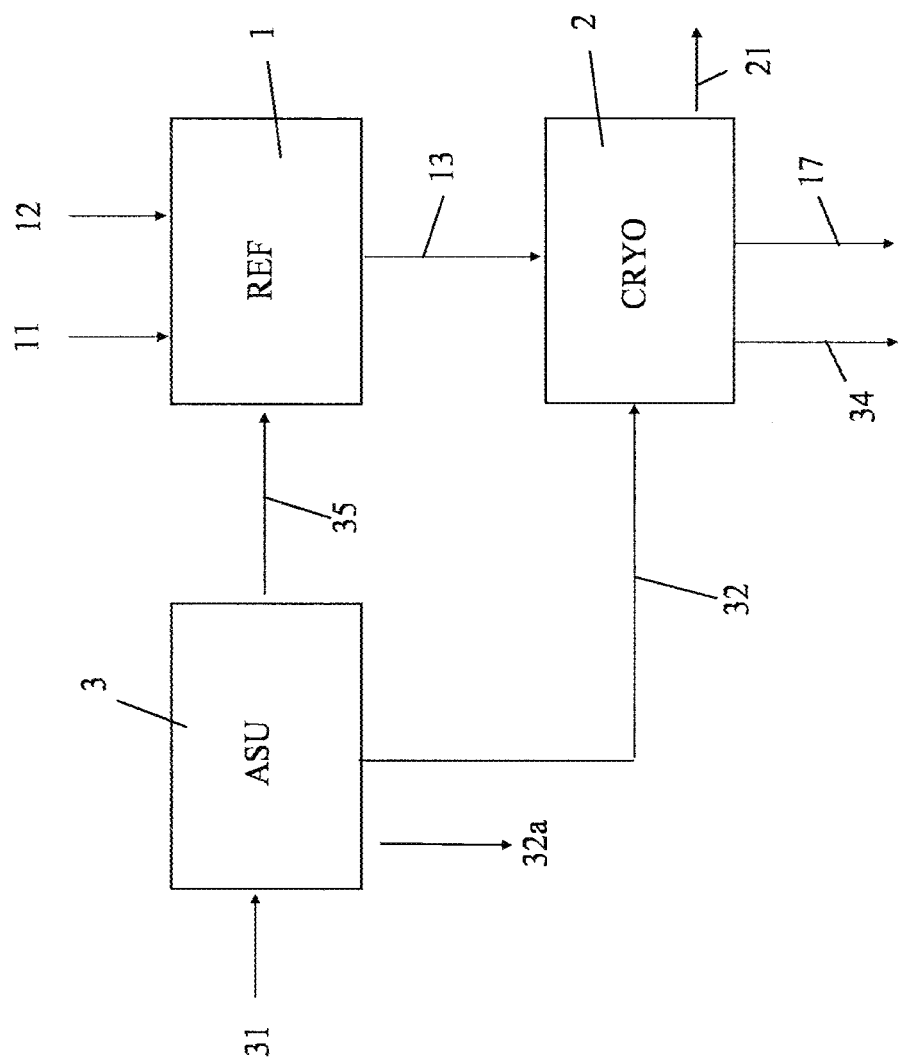
FIG. 1 is a simplified block scheme of the front-end of an ammonia plant operating according to the invention.

Referring to FIG. 1, the front-end of an ammonia plant comprises a reforming section 1 where a hydrocarbon feedstock 11 and steam 12 react to a raw syngas stream 13, comprising hydrogen, nitrogen, plus amounts of CO, $CO_2$, $H_2O$, residual methane, argon and other impurities. The reforming section 1 for example comprises a primary reformer, a secondary reformer and known equipments for treating the reformed syngas with the process steps of shift conversion, $CO_2$ removal and methanation.

The raw syngas stream 13 is fed to a cryogenic section 2 where it is subject to cryogenic liquefaction and removal of impurities, said section 2 delivering a purified syngas 17. This purified syngas 17 is compressed in a syngas compressor and fed to an ammonia synthesis loop.

According to the invention, a liquid nitrogen-rich stream, such as a substantially pure liquid nitrogen 32, is used as a cooling medium to provide net refrigeration to said cryogenic section 2. The liquid nitrogen 32 is at least partly evaporated to furnish the required frigories to the cryo section 2, and recovered from the cryogenic section as flow 34 which is used to adjust, at least partially, the hydrogen/nitrogen ratio of the make-up syngas, i.e. is mixed with the purified syngas 17 or fed to the ammonia synthesis loop.

The nitrogen content of said substantially pure nitrogen stream 32 is more then 99% molar, preferably produced in an air separation unit (ASU) 3. The ASU 3 receives an air feed 31 and provides the liquid nitrogen stream 32 and an oxygen-rich stream 35, which is fed as oxidizer to the secondary reformer of the section 1. The ASU 3 also delivers a nitrogen stream 32a at ambient temperature. The nitrogen required to adjust the HN ratio of the syngas is furnished partly by the stream 34 and partly by said ambient temperature nitrogen 32a.

Figure 2:
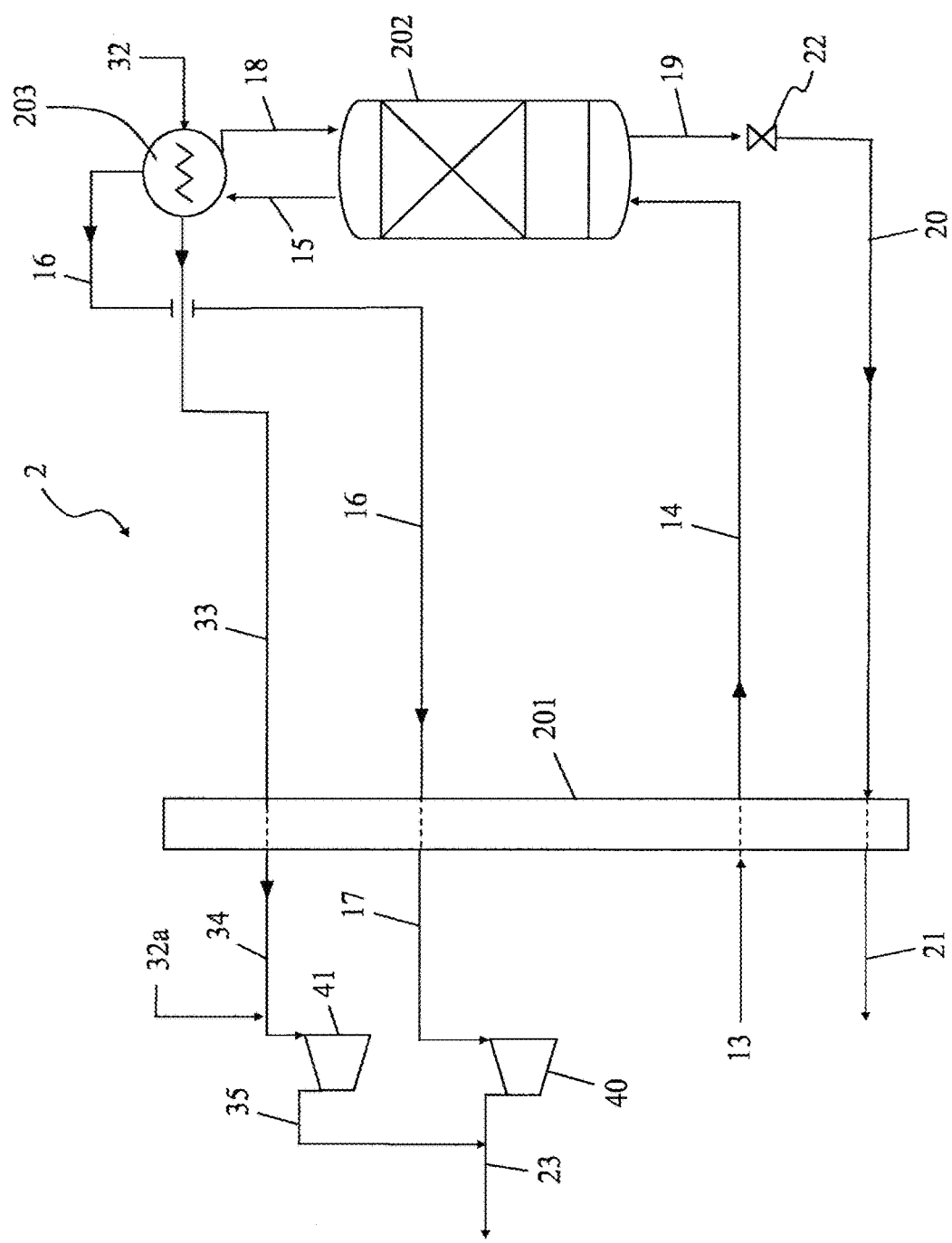
FIG. 2 is a more detailed scheme of a preferred embodiment of the invention.

A preferred embodiment of the cryogenic section 2 and of use of the nitrogen stream 32 is disclosed in FIG. 2.

The cryo section 2 basically comprises a main indirect heat exchanger 201, a gas-washing column 202 and a condenser 203. The raw syngas 13 is cooled to a cryogenic temperature in the main heat exchanger 201, and cooled raw syngas 14 is fed to the column 202, where cryogenic separation of methane, nitrogen and other impurities takes place. The heat exchanger 201 recover frigories from a purified syngas 16 obtained in the column 202 and previously cooled in a condenser 203, from a gaseous nitrogen stream 33 and from a liquid stream 20 separated at bottom of said column 202.

More in detail, the product gas 15 obtained at top of said column 202 is further cooled in the condenser 203, which is refrigerated by the evaporation of the cold, at least partly liquid nitrogen stream 32, obtaining the purified syngas 16 and removing further amounts of methane, nitrogen, and other impurities that are recycled to the column 202 via the liquid recycle stream 18.

The nitrogen stream 32 at least partly evaporates through the condenser 203 and exits as stream 33, which is heated through the main exchanger 201, so cooling the incoming raw syngas 13.

A liquid stream 19, mainly consisting of methane and nitrogen, is recovered at bottom of the column 202, expanded and possibly evaporated in a device 22 such as an expansion valve or a turbine, obtaining a stream 20. Said stream 20 is also re-heated in the main exchanger 201, exiting as a stream 21 that can be used as a fuel. Expansion of stream 19 in a turbine allows to recover some useful work.

Hence, the main exchanger 201 is refrigerated by the nitrogen stream 33, the cold purified syngas 16 and the methane stream 20, all of which contribute to refrigeration of the incoming raw syngas 13.

The reheated and purified syngas 17, exiting the cryo section 2 around ambient temperature, is sent to a main syngas compressor 40 and then to the ammonia synthesis loop. The stream 34 of gaseous, re-heated nitrogen is fed to an appropriate nitrogen compressor 41, and mixed with the compressed purified syngas together with the ambient-temperature nitrogen 32a delivered by the unit 3, to adjust the H/N ratio in the ammonia synthesis loop. The compressed nitrogen 35 is mixed with the output of the syngas compressor 40 forming a syngas stream 23 with the correct HN ratio of around 3:1.

FIG. 2 shows a separate-compression embodiment, where syngas and nitrogen are compressed separately in the compressors 40 and 41, respectively. In other embodiments of the invention, the nitrogen can also be mixed with the purified syngas upstream (e.g. at the intake) the main syngas compressor 40. In this last case, when revamping an existing plant, an existing syngas compressor may need to be revamped in order to accommodate the additional nitrogen.

One of the aspects of the invention is a method for revamping the front-end of an existing ammonia plant. A front-end section comprising at least a primary reformer and a secondary reformer, and the cryogenic section 2 for treatment of the raw syngas, is revamped for example by at least the following operations: installing the air separation unit 3 in parallel to the front-end; providing means feeding the liquid nitrogen-rich stream 32 produced in said air separation unit 3 to said cryogenic section 2, providing a line feeding the oxygen-rich stream 35 produced in the same unit 3 to the secondary reformer of the front-end, in order to increase the capability of the reforming section 1. As clear to a skilled person, the above are the basic steps and further equipments such as valves, piping, auxiliaries etc. will be provided according to the specific needs.

The invention claimed is:

1. A process for making ammonia make-up synthesis gas, comprising the steps of:
reforming a hydrocarbon feedstock, followed by steps of shift, $CO_2$ removal and methanation, to obtain a raw ammonia make-up synthesis gas stream comprising hydrogen and nitrogen;
treating said raw ammonia make-up synthesis gas in a cryogenic purification section obtaining a purified synthesis gas stream;
feeding a liquid nitrogen-rich stream at a cryogenic temperature to said cryogenic purification section;
providing an indirect heat exchange between said raw ammonia make-up synthesis gas and/or a partially purified ammonia make-up synthesis gas and said liquid nitrogen-rich stream in the cryogenic section, said liquid nitrogen-rich stream being at least partly evaporated to provide refrigeration of said cryogenic section; and
treating an air stream in an air separation unit, obtaining said liquid nitrogen-rich stream and an oxygen-rich stream.

2. The process according to claim 1, where said liquid nitrogen-rich stream, after at least a partial evaporation through the cryogenic section, is recovered at an output of said cryogenic section, and mixed with the purified synthesis gas to provide at least a portion of the nitrogen required to adjust the hydrogen/nitrogen ratio of the ammonia make-up synthesis gas.

3. The process according to claim 1, where said air separation unit provides said liquid nitrogen-rich stream, and a second nitrogen-rich stream at ambient temperature and in a gaseous state, and where the amount of nitrogen required to adjust the HN ratio of the ammonia make-up synthesis gas is provided partly by the evaporated liquid nitrogen-rich stream recovered at the output of the cryogenic section and partly by said nitrogen-rich stream at ambient temperature.

4. The process according to claim 1, where said oxygen-rich stream is used as further oxidant in the reforming process, by injection of said oxygen-rich stream into a secondary reformer of the reforming section.

5. The process according to claim 1, wherein:
said raw synthesis gas is cooled down to a cryogenic temperature in a main heat exchanger of the cryogenic section, obtaining a cooled raw synthesis gas;
said cooled raw synthesis gas is fed to a contacting device where a liquid fraction containing impurities is obtained by cryogenic liquefaction and separated from the synthesis gas;
a purified synthesis gas is recovered from said contacting device and is further cooled and purified in a condenser which is refrigerated by at least partial evaporation of said liquid nitrogen-rich stream;
a further purified synthesis gas is taken at the output of said condenser and re-heated in said main heat exchanger, by heat exchange with the incoming raw synthesis gas and with evaporated nitrogen stream taken from said condenser.

6. The process according to claim 5, wherein said liquid fraction containing impurities is further used as a refrigerating medium for the main heat exchanger of the cryogenic section.

7. The process according to claim 1, wherein said liquid nitrogen-rich stream and/or a second nitrogen-rich stream at ambient temperature are substantially pure nitrogen.

8. An equipment for producing ammonia make-up synthesis gas comprising:
- a front-end section comprising a reforming section adapted to reform a hydrocarbon feedstock and to produce a raw ammonia synthesis gas stream;
- a cryogenic purification section treating the raw synthesis gas produced in the front-end;
- an air separation unit feeding a liquid nitrogen-rich stream at a cryogenic temperature to said cryogenic purification section, for use as a heat exchange medium to refrigerate said cryogenic purification section; and
- at least one indirect heat exchanger between said raw ammonia make-up synthesis gas and/or a partially purified ammonia make-up synthesis gas and said liquid nitrogen-rich stream in the cryogenic section, said liquid nitrogen-rich stream being at least partially evaporated in said heat exchanger(s) to provide refrigeration of said cryogenic section;
- wherein said air separation unit further delivers a first liquid nitrogen-rich stream and a second stream of nitrogen at ambient temperature for HN ratio adjustment, and additionally delivers an oxygen-rich stream which is fed as oxidizer to the reforming section; and
- wherein the front-end section further comprises equipment for shift, $CO_2$ removal and methanation.

9. The equipment according to claim 8, further comprising a line for recovering the evaporated nitrogen-rich stream at an output of the cryogenic purification section, and for mixing said nitrogen-rich stream with purified synthesis gas, to provide at least a portion of nitrogen required for adjusting the hydrogen/nitrogen ratio of the ammonia make-up synthesis gas.

10. The equipment according to claim 9, the front-end comprising a primary reformer, a secondary reformer, and equipment for shift, $CO_2$ removal and methanation, said oxygen-rich stream being fed to the secondary reformer of the reforming section.

11. The equipment according to claim 8, the cryogenic section comprising:
- a cryogenic condenser column;
- a condenser receiving a partially-purified synthesis gas obtained in the cryogenic condenser column, said condenser being refrigerated by the liquid nitrogen-rich stream;
- a main heat exchanger where the incoming raw synthesis gas is cooled by heat exchange with one or more of the following: the nitrogen stream evaporated in said condenser, the purified synthesis gas, a bottom effluent of said cryogenic condenser column.

12. The method for revamping the front-end of an ammonia plant, said front-end section comprising a reforming section with at least a primary reformer and a secondary reformer for converting a hydrocarbon feedstock into ammonia raw make-up synthesis gas, the method comprising at least the steps of:
- installing an air separation unit in parallel to said front-end;
- providing a cryogenic section for treatment of the raw synthesis gas, if not present in the original plant;
- providing a line for feeding a liquid nitrogen-rich stream produced in said air separation unit to said cryogenic section, for use as refrigerating medium;
- providing at least one indirect heat exchanger between said raw ammonia make-up synthesis gas and/or a partially purified ammonia make-up synthesis gas and said liquid nitrogen-rich stream in the cryogenic section, said liquid nitrogen-rich stream being at least partially evaporated in said heat exchanger(s) to provide refrigeration of said cryogenic section; and
- providing a line feeding oxygen-rich stream produced in said air separation unit to the secondary reformer, in order to increase the capability of said reforming section.

* * * * *